(12) United States Patent
Osafune et al.

(10) Patent No.: US 10,407,967 B2
(45) Date of Patent: Sep. 10, 2019

(54) DEVICE FOR OPENING AND CLOSING OPENING/CLOSING BODY

(71) Applicant: HI-LEX CORPORATION, Hyogo (JP)

(72) Inventors: Hitoshi Osafune, Hyogo (JP); Hiroyuki Inagaki, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 100 days.

(21) Appl. No.: 15/310,928

(22) PCT Filed: May 14, 2015

(86) PCT No.: PCT/JP2015/063845
§ 371 (c)(1),
(2) Date: Nov. 14, 2016

(87) PCT Pub. No.: WO2015/174474
PCT Pub. Date: Nov. 19, 2015

(65) Prior Publication Data
US 2017/0081895 A1    Mar. 23, 2017

(30) Foreign Application Priority Data
May 14, 2014   (JP) .................................. 2014-100556

(51) Int. Cl.
*E05F 15/622*   (2015.01)
*B60J 5/10*   (2006.01)
(Continued)

(52) U.S. Cl.
CPC ............... *E05F 15/622* (2015.01); *B60J 5/10* (2013.01); *F16H 25/20* (2013.01);
(Continued)

(58) Field of Classification Search
CPC ............... F16H 2025/204; F16H 25/20; F16H 25/2454; E05F 15/622
(Continued)

(56) References Cited

U.S. PATENT DOCUMENTS

| 5,944,376 A | 8/1999 | Buchanan, Jr. |
| 2007/0194599 A1 | 8/2007 | Paton et al. |

(Continued)

FOREIGN PATENT DOCUMENTS

| DE | 202005000559 U1 | 1/2006 | |
| DE | 102008061117 A1 * | 6/2010 | ......... F16H 25/2454 |

(Continued)

OTHER PUBLICATIONS

International Search Report from International Application No. PCT/JP2015/063845 dated Aug. 4, 2015.
(Continued)

*Primary Examiner* — Victor L MacArthur
*Assistant Examiner* — Joseph Brown
(74) *Attorney, Agent, or Firm* — Brundidge & Stanger, P.C.

(57) ABSTRACT

An operable and closable body-opening and closing apparatus includes: a rotary drive member configured to be rotationally driven by a driving force of a drive section; a driving-force transmission member configured to be driven by the rotary drive member and thereby move in a rotation axis direction of the rotary drive member; a biasing member disposed on an outer periphery of the driving-force transmission member and configured to give a biasing force to the driving-force transmission member in the rotation axis direction; and a guide member disposed on an outer periphery of the biasing member and configured to guide the driving-force transmission member. The guide member includes a guide portion configured to guide the driving-
(Continued)

force transmission member in the rotation axis direction while restricting rotation of the driving-force transmission member, and the driving-force transmission member includes a guided portion configured to be guided by the guide portion.

6 Claims, 4 Drawing Sheets

(51) Int. Cl.
  *F16H 25/20* (2006.01)
  *F16H 25/24* (2006.01)
(52) U.S. Cl.
  CPC ..... *E05Y 2900/546* (2013.01); *F16H 25/2454* (2013.01); *F16H 2025/204* (2013.01)
(58) Field of Classification Search
  USPC ........................................................ 74/89.23
  See application file for complete search history.

(56) References Cited

U.S. PATENT DOCUMENTS

| | | | | |
|---|---|---|---|---|
| 2008/0061643 | A1* | 3/2008 | Bochen | ................ E05F 15/622 310/78 |
| 2008/0271552 | A1* | 11/2008 | Arenz | ..................... F16H 25/20 74/89.23 |
| 2009/0199482 | A1* | 8/2009 | Arenz | ................... E05F 15/622 49/279 |
| 2009/0200830 | A1* | 8/2009 | Paton | ................... E05F 15/622 296/146.8 |
| 2010/0186528 | A1* | 7/2010 | Hillen | ................ F16H 25/2021 74/89.23 |
| 2011/0290050 | A1 | 12/2011 | Kummer et al. | |

FOREIGN PATENT DOCUMENTS

| | | | | |
|---|---|---|---|---|
| DE | 102008062391 A1 | | 6/2010 | |
| DE | 202010009334 U1 | * | 9/2011 | ............ E05F 15/622 |
| DE | 102011122316 A1 | * | 6/2013 | ............. F16H 25/20 |
| EP | 1826047 A2 | | 8/2007 | |
| EP | 1840310 A1 | * | 10/2007 | ............. F16H 25/20 |
| EP | 2679865 A1 | * | 1/2014 | ............. F16H 25/20 |
| JP | 2003003745 A | | 1/2003 | |
| JP | 2012-512973 A | | 6/2012 | |
| WO | WO-2013161687 A1 | * | 10/2013 | ............ F16F 9/0245 |

OTHER PUBLICATIONS

Extended European Search Report for 15793455.5 dated Jan. 4, 2018.

* cited by examiner

DEVICE FOR OPENING AND CLOSING OPENING/CLOSING BODY

TECHNICAL FIELD

The present invention relates to an openable and closable body-opening and closing apparatus.

BACKGROUND ART

As a method for driving an openable and closable body that opens and closes with rotation, such as a backdoor of an automobile or an outward-opening window, there is a method using an openable and closable body-opening and closing apparatus that operates to open and close the openable and closable body. In this openable and closable body-opening and closing apparatus, for example, an opening and closing operation of the openable and closable body is controlled by controlling extension and retraction of a shaft driven by a motor. This enables appropriate adjustment of an opening and closing position and/or an opening and closing speed of the openable and closable body without directly opening and closing the openable and closable body by a human. For this reason, this openable and closable body-opening and closing apparatus has high usability.

The openable and closable body-opening and closing apparatus as described above is provided with, for example, a spindle that is rotationally driven by a motor, a spindle nut that converts a rotary motion of the spindle into displacement in a rotation axis direction, and a push rod coupled to the spindle nut. In addition, this openable and closable body-opening and closing apparatus using the spindle is further provided with, for example, a guide portion that guides movement of the spindle nut in the rotation axis direction, and a cylindrical spring that assists the displacement of the spindle nut in the rotation axis direction (e.g., see Patent Literature (hereinafter, referred to as "PTL") 1). In this openable and closable body-opening and closing apparatus, the push rod supporting the spindle nut that is displaced in the axis direction of the spindle by the motor driving causes the openable and closable body attached to a ball socket at a distal end of the push rod to perform opening and closing motion. During this operation, the cylindrical spring provided outside the guide portion for guiding the spindle nut outside the spindle nut assists the opening and closing motion of the openable and closable body, thereby making it possible to drive the openable and closable body to open and close with a relatively low driving force of the motor.

CITATION LIST

Patent Literature

PTL 1
Japanese Unexamined Patent Application Publication (Translation of PCT Application) No. 2012-512973

SUMMARY OF INVENTION

Technical Problem

The invention disclosed in PTL 1, however, includes, outside of the spindle nut, a guide part to prevent relative rotation of the spindle nut, and this guide part even has notches in which ribs are fitted to avoid direct contact with the cylindrical spring. For that reason, at least the spindle, the spindle nut, the guide part and the cylindrical spring are required as a configuration including the push rod and the cylindrical spring that cause a force to act on the openable and closable body, and the cylindrical spring even has the notches in which the ribs are fitted. Consequently, a width corresponding to this configuration is required as a region that is displaced with respect to the drive section.

In the openable and closable body to which the openable and closable body-opening and closing apparatus as described above is attached, an attachment position of the openable and closable body-opening and closing apparatus in the openable and closable body is constrained by a layout, for example, a layout where a recess and/or a protrusion is formed to dispose a taillight, a layout where a frame is narrowed to increase the size of a window glass for better visibility, or the like. In other words, as the attachment space for the openable and closable body-opening and closing apparatus is reduced in size, the degree of freedom in layout increases for the openable and closable body. This improves the merchantability of the openable and closable body. For this reason, the periphery of the region of the openable and closable body-opening and closing apparatus used for attachment to the openable and closable body, i.e., an operating section of the openable and closable body-opening and closing apparatus that is relatively displaced with respect to the drive section preferably has a small outer diameter.

It is therefore an object of the present invention to provide an openable and closable body-opening and closing apparatus with a reduced outer diameter.

Solution to Problem

An openable and closable body-opening and closing apparatus of the present invention includes a rotary drive member, a driving-force transmission member, a biasing member, and a guide member. The rotary drive member is rotationally driven by a driving force of a drive section. The driving-force transmission member is driven by the rotary drive member and thereby moves in a rotation axis direction of the rotary drive member. The biasing member is disposed on an outer periphery of the driving-force transmission member and gives a biasing force to the driving-force transmission member in the rotation axis direction. The guide member is disposed on an outer periphery of the biasing member and guides the driving-force transmission member. The guide member includes a guide portion configured to guide the driving-force transmission member in the rotation axis direction while restricting rotation of the driving-force transmission member. The driving-force transmission member includes a guided portion configured to be guided by the guide portion.

In the openable and closable body-opening and closing apparatus of the present invention, the biasing member is disposed on the outer periphery of the driving-force transmission member and the guide member is disposed on the outer periphery of the biasing member. With this configuration, since there is no need to interpose a guide member between the driving-force transmission member and the biasing member, a configuration inside the biasing member configured to cause an operation force to act on the openable and closable body, which is an operation object, can be simplified as compared to the case where the biasing member is disposed on the outer periphery of the guide member, and thus the openable and closable body drive apparatus can be reduced in diameter.

The openable and closable body-opening and closing apparatus of the present invention may further include a first rotation restriction section configured to restrict rotation of the guide member by being biased by a biasing force of the biasing member. Thus, in a case where the first rotation restriction section that restricts the rotation of the guide member is biased by the biasing force of the biasing member, the first rotation restriction section can be provided at a position facing end portions of the biasing member and the guide member in the rotation axis direction. That is, although the member that restricts the rotation of the guide member needs to be prevented from rotating relative to the drive section, there is no need to additionally provide a member that fixes the member configured to perform the rotational restriction described above. Therefore, in addition to the reduction in the diameter of the openable and closable body drive apparatus, the rotational restriction of the guide member is made possible with a simple apparatus configuration.

In a case where the openable and closable body-opening and closing apparatus of the present invention includes the first rotation restriction section, the first rotation restriction section may be rotationally restricted by being biased by the biasing force of the biasing member, and moreover, the first rotation restriction section may engage with the guide member and thereby restrict the rotation of the guide member. As described, in a case where the first rotation restriction section that engages with the guide member is rotationally restricted by being biased by the biasing force of the biasing member, the first rotation restriction section can be provided at a position facing the end portions of the biasing member and the guide member in the rotation axis direction. That is, since the first rotation restriction section can be configured as a member separate from the guide member, assembly of the apparatus is easy and rotational restriction of the guide member is also possible.

The openable and closable body-opening and closing apparatus of the present invention may further include a second rotation restriction section configured to restrict movement of the guide member in the rotation axis direction and to restrict the rotation of the guide member. As described, in a case where the second rotation restriction section configured to restrict the rotation of the guide member restricts the movement of the guide member in the rotation axis direction, the second rotation restriction section can be provided at a position facing the end portion of the guide member in the rotation axis direction. That is, it is possible to restrict the movement of the guide member in the rotation axis direction and/or to restrict the rotation of the guide member without provision of a member that restricts the movement of the guide member in the rotation axis direction and/or a member that restricts the rotation of the guide member on the outer periphery of the guide member.

Advantageous Effects of Invention

According to the openable and closable body-opening and closing apparatus of the present invention, the openable and closable body-opening and closing apparatus can be made small in diameter. As a result, the openable and closable body-opening and closing apparatus can be reduced in diameter.

In the openable and closable body-opening and closing apparatus of the present invention, in a case where the first rotation restriction section configured to restrict the rotation of the guide member is biased by the biasing force of the biasing member, there is no need to additionally provide a member that fixes the first rotation restriction section. Consequently, the guide member can be rotationally restricted without an increase in the diameter of the openable and closable body-opening and closing apparatus.

In the openable and closable body-opening and closing apparatus of the present invention, in a case where the first rotation restriction section configured to engage with the guide member is rotationally restricted by being biased by the biasing force of the biasing member, the openable and closable body-opening and closing apparatus can be an apparatus capable of being easily assembled, without an increase in the diameter of the openable and closable body-opening and closing apparatus.

In the openable and closable body-opening and closing apparatus of the present invention, in a case where the second rotation restriction section configured to restrict the rotation of the guide member restricts the movement of the guide member in the rotation axis direction, it is possible to simply restrict the rotation of the guide member and/or restrict the movement of the guide member in the rotation axis direction without an increase in the diameter of the openable and closable body-opening and closing apparatus.

DESCRIPTION OF EMBODIMENTS

Hereinafter, an embodiment for implementing the present invention will be described in detail with reference to the accompanying drawings.

1. EMBODIMENT

Hereinafter, openable and closable body-opening and closing apparatus 1 according to an embodiment of the present invention will be described.

[Configuration]

Figure 1:
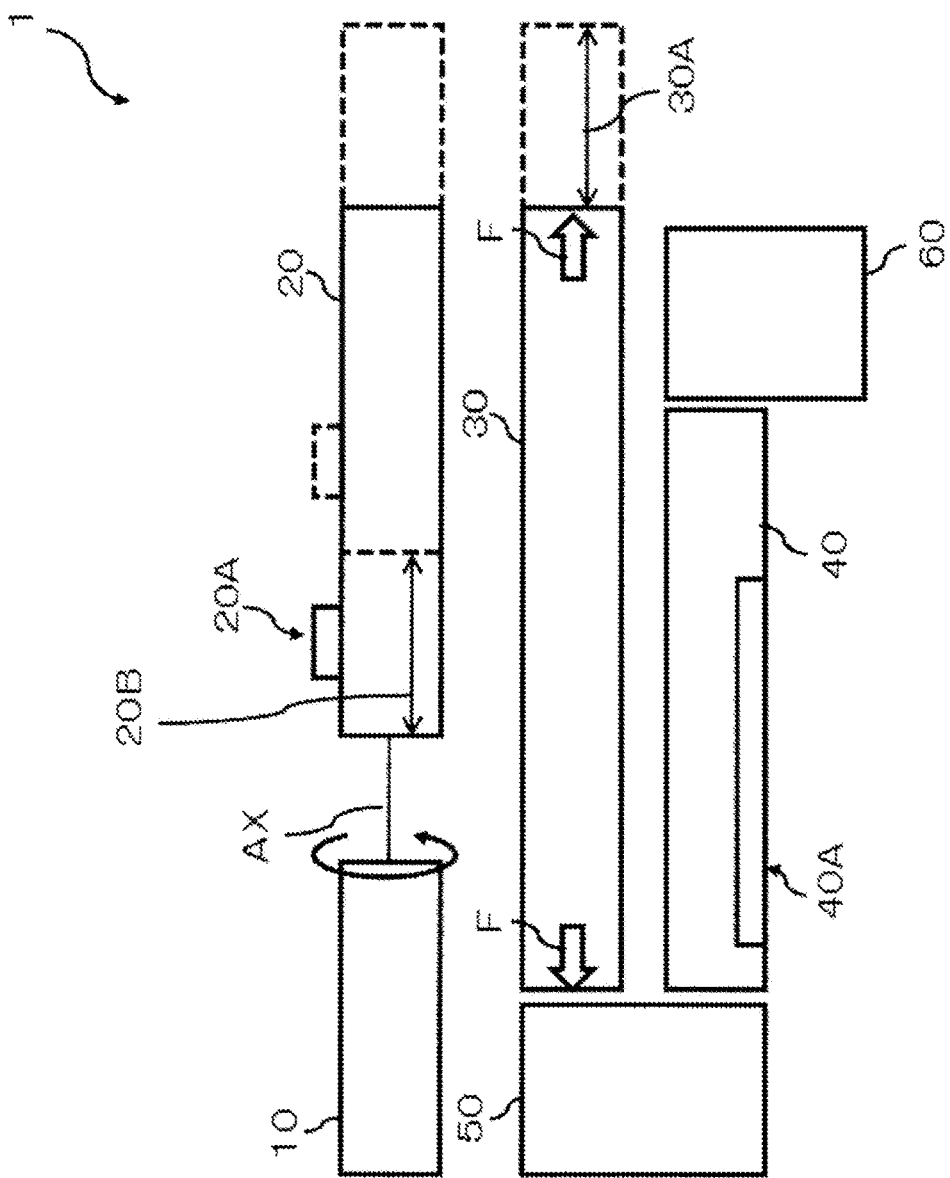
FIG. 1 is a diagram illustrating functional blocks of an openable and closable body-opening and closing apparatus of the present invention.
Figure 2:
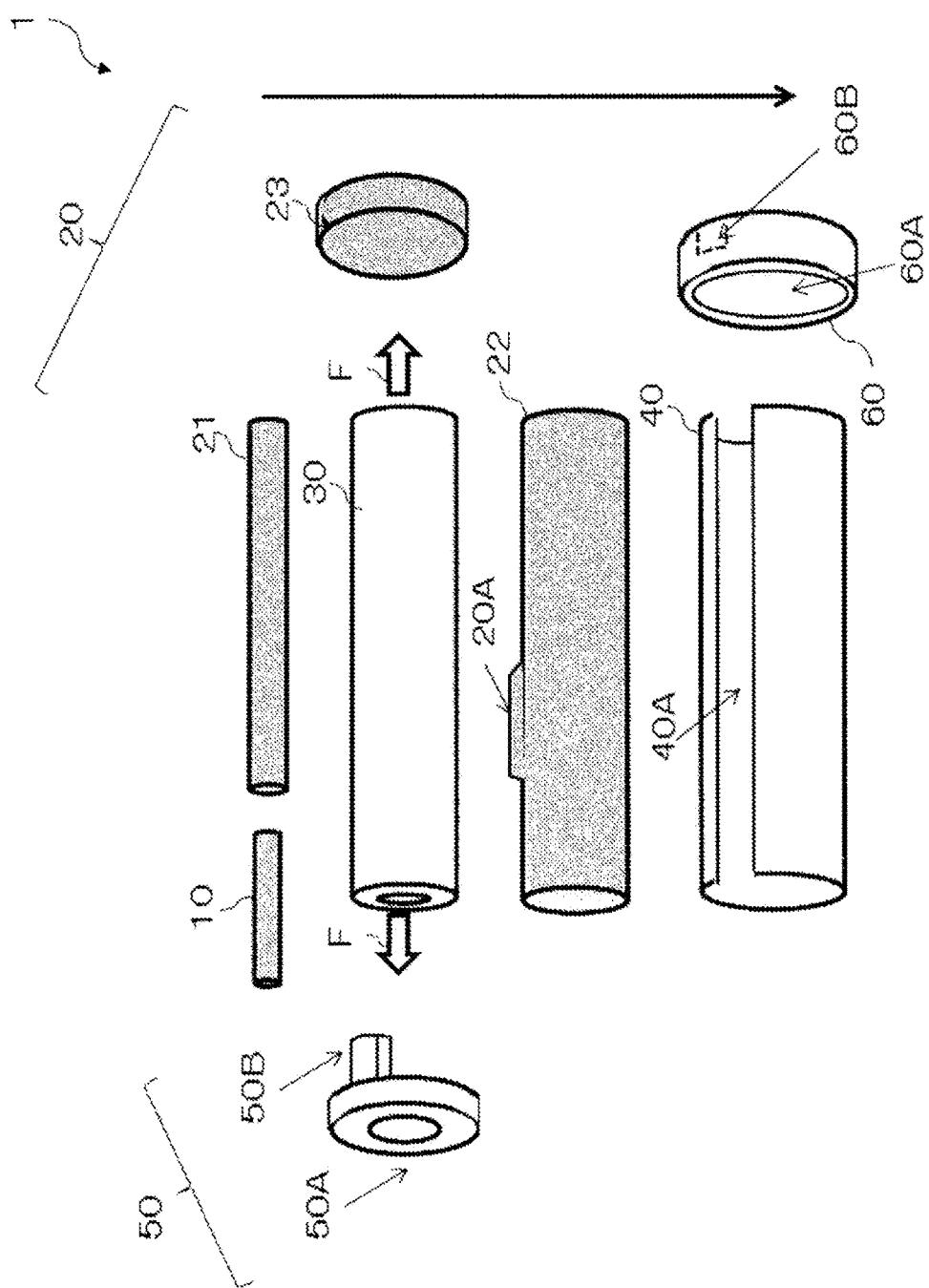
FIG. 2 is a diagram illustrating an example of an exploded perspective configuration of the openable and closable body-opening and closing apparatus according to an embodiment of the present invention.
Figure 3:
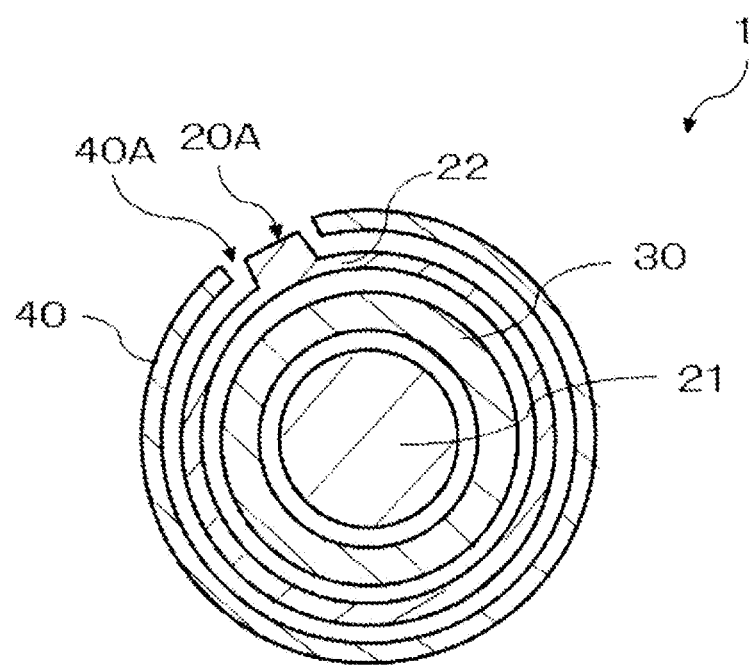
FIG. 3 is a diagram illustrating an example of a cross-sectional configuration of the openable and closable body-opening and closing apparatus in FIG. 2.

First, a description will be given of a configuration of openable and closable body-opening and closing apparatus 1. FIG. 1 illustrates functional blocks of openable and closable body-opening and closing apparatus 1. FIG. 2 illustrates an example of an exploded perspective configuration of openable and closable body-opening and closing apparatus 1 in FIG. 1. FIG. 3 illustrates an exemplary cross-sectional configuration of openable and closable body-opening and closing apparatus 1 in FIG. 2. Openable and closable body-opening and closing apparatus 1 is used to open and close an openable and closable body such as a backdoor of an automobile, an outward opening window and the like. Openable and closable body-opening and closing apparatus 1 includes rotary drive member 10, driving-force transmission member 20, biasing member 30 and guide member 40. Openable and closable body-opening and closing apparatus 1 further includes first rotation restriction section 50 and second rotation restriction section 60. Note that, one of first and second rotation restriction sections 50 and 60 can be omitted as appropriate.

Rotary drive member 10 is rotationally driven by a driving force of a drive section (not illustrated). Rotary drive member 10 rotates about rotation axis AX. One end of rotary drive member 10 is connected to the drive section, and driving-force transmission member 20 is rotationally driven by rotary drive member 10.

Driving-force transmission member 20 is driven by rotary drive member 10 and moves in a direction of rotation axis AX of rotary drive member 10. Driving-force transmission member 20 moves in a direction away from the drive section by driving of rotary drive member 10. Driving-force transmission member 20 converts a rotary motion of rotary drive member 10 into displacement in the direction of rotation axis AX. Driving-force transmission member 20 moves within a range in which driving-force transmission member 20 can be guided by guide member 40. For example, driving-force transmission member 20 may be configured to move in such a way that an end portion of driving-force transmission member 20 on the side of the drive section is positioned in a region (e.g., movable region 20B) on the side of the drive section with respect to an end portion of guide member 40 on the side of second rotation restriction section 60. Driving-force transmission member 20 includes guided portion 20A that is guided by guide portion 40A to be described, hereinafter.

For example, as illustrated in FIG. 2 and FIG. 3, openable and closable body-opening and closing apparatus 1 includes guide nut 21 which serves as a driving-force transmission member, inner tube 22 and slide end 23. Guide nut 21 is displaced in the direction of rotation axis AX to convert a rotary motion of rotary drive member 10 into a linear motion. Slide end 23 is connected to a distal end of guide nut 21, and a distal end of inner tube 22 is also connected to slide end 23. Therefore, as guide nut 21 moves in the direction of rotation axis AX, inner tube 22 and slide end 23 also move in the direction of rotation axis AX.

Guide nut 21 is disposed inside biasing member 30. Guide nut 21 guides the movement of biasing member 30 in the direction of rotation axis AX. Inner tube 22 is disposed on an outer periphery of biasing member 30 and is disposed, for example, along the outer circumference of biasing member 30. Inner tube 22 has, for example, a cylindrical shape and has guided portion 20A at a circumferential surface of the cylindrical shape. Since inner tube 22 has guided portion 20, inner tube 22 also has a function as a guided member when guided portion 20 is guided in the direction of rotation axis AX as will be described, hereinafter. Inner tube 22 also has a function as a protective member that protects biasing member 30 and guide nut 21 from outside by covering the outer circumference of biasing member 30. Guided portion 20A is composed of a protruding portion that protrudes in a diameter direction, for example. Slide end 23 is disposed on rotation axis AX of rotary drive member 10 so as to be connected to end portions of guide nut 21, inner tube 22 and biasing member 30 on a side opposite to a side of rotary drive member 10. Note that, the guided portion may not be provided on the outer periphery of the inner tube when the guided portion is directly or indirectly connected to driving-force transmission member 20, and is rotationally restricted and guided for movement in the direction of rotation axis AX by the guide portion.

Biasing member 30 is disposed on the outer periphery of driving-force transmission member 20, and disposed, for example, along the outer circumference of driving-force transmission member 20. Biasing member 30 is coupled to driving-force transmission member 20 via slide end 23 at the end portion of biasing member 30 on the side opposite to the drive section, and provides biasing force F to slide end 23 in the direction of rotation axis AX. That is, slide end 23, which is a member that that couples driving-force transmission member 20 and biasing member 30 together, is given a force that causes guide nut 21 to move rectilinearly in the direction of rotation axis AX and biasing force F and provides a resultant force of these forces to an attachment target to which slide end 23 is connected. One end side of biasing member 30 is connected to first rotation restriction section 50 and the other end side thereof is connected to driving-force transmission member 20. Biasing member 30 is disposed between the drive section and slide end 23 so as to bias slide end 23, which is a coupling member, and biasing member 30 is disposed coaxially with guide nut 21. Biasing member 30 may be fixed to slide end 23 at the end portion of biasing member 30, but is also connectable with slide end 23, which is a coupling member, by pressing slide end 23. Biasing member 30 is expandable and contractable in the direction of rotation axis AX and composed of, for example, a spring.

Guide member 40 is disposed on the outer periphery of biasing member 30. In a case where rotary drive member 10 rotates about the axis direction and driving-force transmission member 20 rotates following the rotation of rotary drive member 10, in the same direction as the rotation of rotary drive member 10, it is difficult for driving-force transmission member 20 to move in the direction of rotation axis AX. That is, when driving-force transmission member 20 rotates following the rotation of rotary drive member 10, it is hard to drive openable and closable body-opening and closing apparatus 1. Therefore, in order to drive openable and closable body-opening and closing apparatus 1, guide member 40 restricts the rotation of driving-force transmission member 20. In order for driving-force transmission member 20 to move in the direction of rotation axis AX, guide member 40 restricts the rotation of driving-force transmission member 20 within a moving range of driving-force transmission member 20. The rotation of guide member 40 itself is restricted. When guide member 40 is restricted such that openable and closable body-opening and closing apparatus 1 is driven, the rotation of guide member 40 itself can be restricted. For example, guide member 40 may be fixed to another member through adhesion or the like, and the rotation of guide member 40 itself may be blocked. Guide member 40 further includes guide portion 40A that guides driving-force transmission member 20 in the direction of rotation axis AX while restricting the rotation of driving-force transmission member 20. Examples of the restriction of the rotation of driving-force transmission member 20 by guide member 40 include blocking of the rotation of driving-force transmission member 20 by guide member 40. Guide portion 40A guides driving-force transmission member 20 in the direction of rotation axis AX via guided portion 20A of driving-force transmission member 20.

As illustrated in FIGS. 2 and 3, guide member 40 has a substantially cylindrical shape, for example, and includes guide portion 40A at a circumferential surface of the cylinder. Guide portion 40A has, for example, an elongated shape extending in the direction of rotation axis AX and is composed of a slit, for example. When guide portion 40A is composed of a slit and guided portion 20A is composed of a protruding portion, guided portion 20A is fitted to guide portion 40A. Therefore, guided portion 20A is prevented from rotating about the rotation axis AX by guide portion 40A. Meanwhile, guided portion 20A can slide in the direction of rotation axis AX. Therefore, guide member 40 blocks the rotation of driving-force transmission member 20 and also guides the movement of driving-force transmission member 20 in the direction of rotation axis AX. Note that guide portion 40A may also be a recess portion extending in the direction of rotation axis AX or an elongated protruding portion that protrudes inward in the diameter direction of guide member 40.

First rotation restriction section 50 is biased by biasing force F of biasing member 30 and thereby restricts the rotation of guide member 40. First rotation restriction section 50 engages with, for example, guide member 40 and thereby restricts the rotation of guide member 40. The restriction of the rotation of guide member 40 by first rotation restriction section 50 is sufficient as long as guide member 40 is restricted such that openable and closable body-opening and closing apparatus 1 is driven. Examples of how the rotation of guide member 40 is restricted include blocking of the rotation of guide member 40 by first rotation restriction section 50. Examples of how first rotation restriction section 50 engages with guide member 40 include fitting of first rotation restriction section 50 to guide member 40. Note that, first rotation restriction section 50 may restrict the rotation of guide member 40 by, for example, locking guide member 40. First rotation restriction section 50 is biased by biasing force F of biasing member 30, thereby restricted the rotation of first rotation restriction section 50 itself. Regarding the restriction of the rotation of first rotation restriction section 50, itself, for example, biasing member 30 presses first rotation restriction section 50 by being biased by biasing force F of biasing member 30, and the rotation of first rotation restriction section 50 may be restricted by a frictional force with biasing member 30, and/or the rotation of first rotation restriction section 50 may be blocked.

As illustrated, for example, in FIG. 2, first rotation restriction section 50 is composed of a component in which protruding portion 50B extending in the direction of rotation axis AX is provided to annular pedestal portion 50A. That is, first rotation restriction section 50 is provided as a member separate from a non-movable section (not illustrated in FIG. 2) in openable and closable body-opening and closing apparatus 1. Pedestal portion 50A is biased by biasing force F of biasing member 30 and thereby fixed to the non-movable portion in openable and closable body-opening and closing apparatus 1. That is, protruding portion 50B is fixed to the non-movable section in openable and closable body-opening and closing apparatus 1 via pedestal portion 50A. Protruding portion 50B is fitted to guide portion 40A of guide member 40. Therefore, protruding portion 50B is fitted to guide portion 40A and protruding portion 50B and thereby restricts the rotation of guide member 40 by being biased by biasing member 30.

Second rotation restriction section 60 restricts the rotation of guide member 40. Examples of how the rotation of guide member 40 is restricted by second rotation restriction section 60 include blocking of the rotation of guide member 40 by second rotation restriction section 60. Second rotation restriction section 60, for example, engages with guide member 40 or locks guide member 40. Examples of how second rotation restriction section 60 engages with guide member 40 include fitting of second rotation restriction section 60 to guide member 40. The rotation of second rotation restriction section 60 itself is restricted, and for example, the rotation of second rotation restriction section 60 itself is prevented. Second rotation restriction section 60 is fixed to a non-movable section in openable and closable body-opening and closing apparatus 1 via, for example, an exterior member (not illustrated). Second rotation restriction section 60 may be provided in such a way that, while the rotation of guide member 40 is restricted by first rotation restriction section 50, second rotation restriction section 60 suppresses movement of guide member 40 together with guided portion 20A in the direction of rotation axis AX.

As illustrated, for example, in FIG. 2, second rotation restriction section 60 is composed of an annular cap that includes opening portion 60A through which driving-force transmission member 20 can be inserted. For example, a protruding portion 60B is provided in an inner surface of the cap. Protruding portion 60B is fitted to guide portion 40A. Therefore, protruding portion 60B is fitted to guide portion 40A and thereby blocks the rotation of guide member 40.

First and second rotation restriction sections 50 and 60 restrict the movement of guide member 40 in the direction of rotation axis AX, and for example, block the movement of guide member 40 in the direction of rotation axis AX. One end of guide member 40 may be in contact with first rotation restriction section 50 or may be disposed facing first rotation restriction section 50 with a predetermined interval interposed therebetween in the direction of rotation axis AX. The other end of guide member 40 may be into contact with second rotation restriction section 60 or may be disposed facing second rotation restriction section 60 with a predetermined interval interposed therebetween in the direction of rotation axis AX.

When guide member 40 is in contact with first and second rotation restriction sections 50 and 60, the movement of guide member 40 in the direction of rotation axis AX is blocked by first and second rotation restriction sections 50 and 60. When guide member 40 is disposed facing at least one of first and second rotation restriction sections 50 and 60 with a predetermined interval interposed therebetween in the direction of rotation axis AX, guide member 40 can move in the direction of rotation axis AX by the amount of the abovementioned interval. However, the movement of guide member 40 beyond the interval in the direction of rotation axis AX is blocked by first and second rotation restriction sections 50 and 60.

When at least first rotation restriction section 50 is omitted from first and second rotation restriction sections 50 and 60, the end portion of guide member 40 may be fixed to the non-movable section in openable and closable body-opening and closing apparatus 1 by a chemical or mechanical method or the like. Examples of the chemical method include adhesion of the end portion of guide member 40 and the non-movable section with an adhesive or sticking together of the same with glue. Examples of the mechanical method include swaging of the non-movable section on the end portion of guide member 40, or screwing of the end portion of guide member 40 to the non-movable portion.

When first rotation restriction section 50 is not omitted and second rotation restriction section 60 is omitted, the end portion of guide member 40 may be fixed to first rotation restriction section 50 by a chemical or mechanical method or the like. Examples of the chemical method include adhesion of the end portion of guide member 40 and first rotation restriction section 50 with an adhesive, or sticking together of the same with glue. Examples of the mechanical method include swaging of first rotation restriction section 50 on the end portion of guide member 40, or screwing of the end portion of guide member 40 to first rotation restriction section 50.

[Operation]

Next, an example of an operation of openable and closable body-opening and closing apparatus 1 will be described.

The distal end of driving-force transmission member 20 is coupled to an openable and closable body (not illustrated) and the non-movable section of openable and closable body-opening and closing apparatus 1 is coupled to a structure provided with the openable and closable body. Then, rotary drive member 10 is driven to rotate about the rotation axis AX by a driving force of a drive section (not illustrated). Rotation of driving-force transmission member 20 is restricted by guide member 40, and driving-force transmission member 20 moves in the direction of rotation axis AX (direction of the side opposite to the side of the drive section) of the rotary drive member 10. At this time, since openable and closable body-opening and closing apparatus 1 also includes biasing member 30, openable and closable body-opening and closing apparatus 1 can output a resultant force of a pressing force by the movement of driving-force transmission member 20 and biasing force F to the openable and closable body. As a result, when the user opens and closes the openable and closable body, the opening and closing operation of the openable and closable body is assisted by extension and retraction of openable and closable body-opening and closing apparatus 1, and the openable and closable body can be automatically opened and closed via electromotive drive of openable and closable body-opening and closing apparatus 1.

[Effects]

Next, effects of openable and closable body-opening and closing apparatus 1 will be described.

Openable and closable body-opening and closing apparatus 1 outputs a driving force as openable and closable body-opening and closing apparatus 1 to the openable and closable body, and the driving force is composed of a pushing and pulling force applied to the openable and closable body by the movement of driving-force transmission member 20 and biasing force F of biasing member 30. Therefore, in order for openable and closable body-opening and closing apparatus 1 to perform outputting, at least driving-force transmission member 20 and biasing member 30 need to move or expand and contract in the direction of rotation axis AX so as to output the resultant force. In openable and closable body-opening and closing apparatus 1, herein, biasing member 30 is disposed on the outer periphery of rotary drive member 20, and guide member 40 is disposed on the outer periphery of biasing member 30. With this configuration, since there is no guide member interposed between biasing member 30 and rotary drive member 20, the diameter of the member that outputs a driving force by driving-force transmission member 20 and biasing member 30 can be small as compared to a case where biasing member 30 is disposed on the outer periphery of guide member 40. Therefore, openable and closable body-opening and closing apparatus 1, particularly, biasing member 30, which is a member involved in driving, can be reduced in diameter.

In openable and closable body-opening and closing apparatus 1, when first rotation restriction section 50 is provided at a position facing the end portion of guide member 40 in the direction of rotation axis AX, the rotation of guide member 40 can be restricted without an increase in the diameter of openable and closable body-opening and closing apparatus 1. Likewise, in openable and closable body-opening and closing apparatus 1, when second rotation restriction section 60 is disposed at a position facing the end portion of guide member 40 in the direction of rotation axis AX, the rotation of guide member 40 can be restricted without an increase in the diameter of openable and closable body-opening and closing apparatus 1.

2. EXAMPLE

Next, an example of openable and closable body-opening and closing apparatus 1 according to the above embodiment will be described.

[Configuration]

Figure 4:
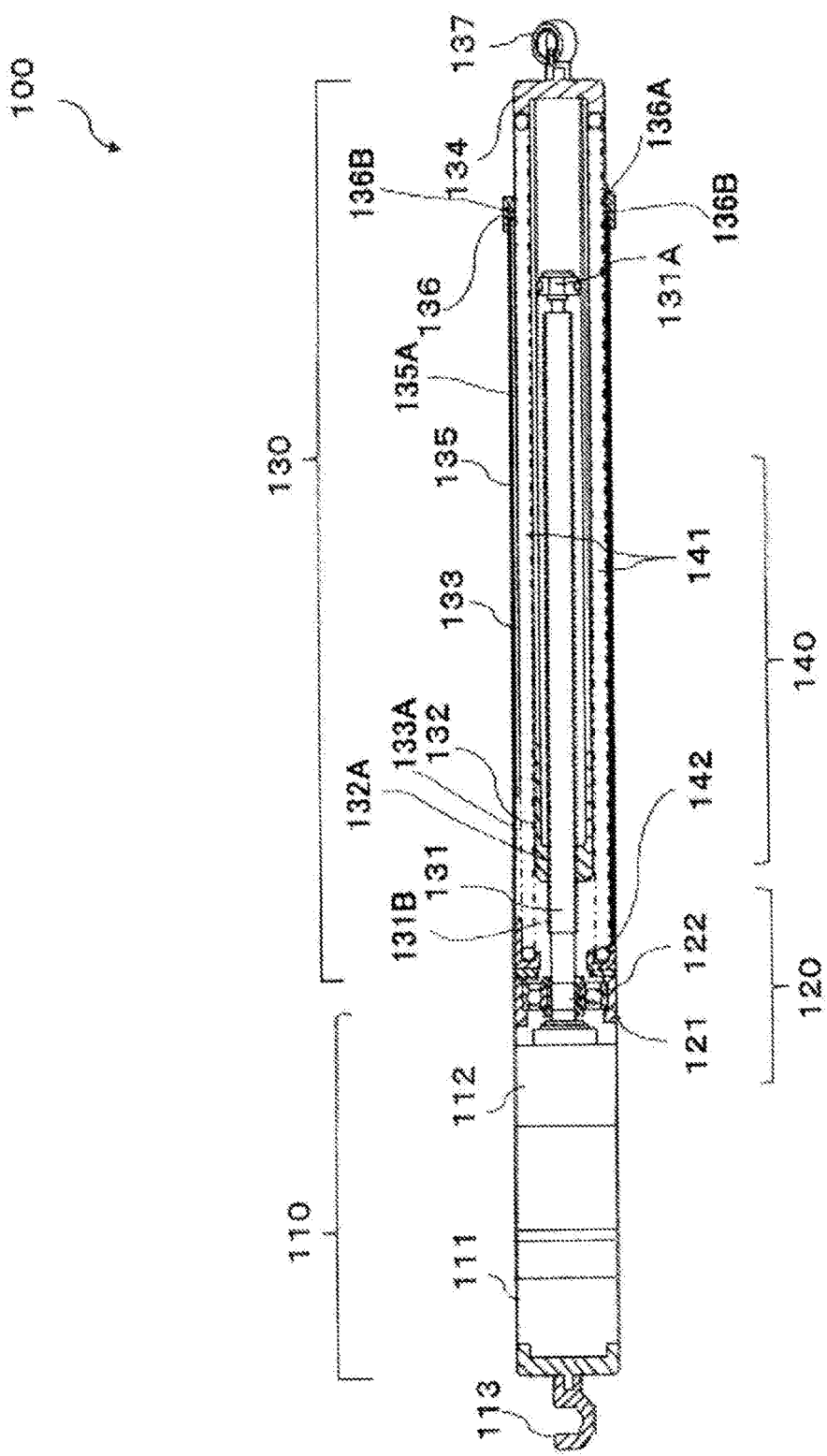
FIG. 4 is a diagram illustrating a cross-sectional configuration according to an example of the openable and closable body-opening and closing apparatus in FIG. 2.

FIG. 4 illustrates a cross-sectional configuration of openable and closable body-opening and closing apparatus 100 according to the example. Openable and closable body-opening and closing apparatus 100 includes: outer tube 111 that incorporates power section 110 and bearing section 120; and actuator section 130, and actuator section 130 includes spring section 140. Support section 113 is provided at a proximal end of outer tube 111 and support section 137 is provided at a distal end of actuator section 130. Outer tube 111 is configured to accommodate actuator section 130 therein in a state where openable and closable body-opening and closing apparatus 100 is retracted, and outer tube 111 is configured such that guide nut 132, inner tube 133 and spring 141 of actuator section 130 extend therefrom in a state where openable and closable body-opening and closing apparatus 100 is extended.

(Power Section 110)

Power section 110 is provided inside outer tube 111 and includes motor 112. Note that outer tube 111 has, for example, a cylindrical shape. Motor 112, bearing section 120 and actuator section 130 are provided so as to be protected by outer tube 111, which is an exterior member, and to function as a drive section.

(Outer Tube 111)

Outer tube 111 has a bottomed cylindrical shape and is installed, as a base in openable and closable body-opening and closing apparatus 100, to a structure (not illustrated), which serves as a base body of relative movement via an opening and closing operation of the openable and closable body via support section 113. Outer tube 111 is provided with cap 136, which will be described, hereinafter. For example, a circumferential surface of the cylinder at an open end portion of outer tube 111 is male threaded, and this male thread is fitted to a female thread of cap 136. Therefore, in outer tube 111, the female thread of cap 136 and the male thread of outer tube 111 are fitted to each other, thereby fixing cap 136. Outer tube 111 is also a structural member that supports a load in the direction of rotation axis AX when openable and closable body-opening and closing apparatus 100 operates, and is composed of a case having a high rigidity (e.g., iron, aluminum alloy, or high strength engineering plastic).

(Motor 112)

Motor 112 is disposed such that the axis of rotation of motor 112 is coaxial with the central axis of outer tube 111. Motor 112 is an electric motor. Examples of the type of electric motor include a DC motor and an AC motor. When openable and closable body-opening and closing apparatus 100 is used for opening and closing of a door of an automobile, a DC motor is preferably used for motor 112 because the automobile is provided with a DC power supply. Motor 112 is fixed to the inside of outer tube 111 so as to be immovable with respect to outer tube 111 for reducing output loss.

(Support Section 113)

Support section 113 is provided at an end portion of outer tube 111. Support section 113 is configured such that openable and closable body-opening and closing apparatus 100 is rotatably supported to an attachment target structure, and support section 113 is composed of, for example, a ball socket joint.

(Bearing Section 120)

Bearing section 120 includes: shaft section 121 coupled to a rotating shaft of motor 112; and bearing 122 that rotatably supports shaft section 121. Shaft section 121 is disposed to be coaxial with the rotating shaft of motor 112 to be capable of transmitting a driving force of motor 112, while being rotatably supported by bearing 122. Bearing 122 is, for example, a rolling bearing.

(Actuator Section 130)

Actuator section 130 includes screw 131, guide nut 132, inner tube 133, slide end 134, sleeve 135, cap 136, support section 137 and spring section 140. Screw 131 is a member corresponding to a specific example of rotary drive member 10 of the above embodiment. Guide nut 132 is a member corresponding to a specific example of guide nut 21 of the above embodiment. Inner tube 133 is a member corresponding to a specific example of inner tube 22 of the above embodiment. Slide end 134 is a member corresponding to a specific example of slide end 23 of the above embodiment. Sleeve 135 is a member corresponding to a specific example of guide member 40 of the above embodiment. Cap 136 is a member corresponding to a specific example of second rotation restriction section 60 of the above embodiment. Therefore, in the following description of actuator section 130, part of the description of actuator section 130 that overlaps the content already described in the above embodiment will be omitted as appropriate.

Screw 131 is coupled to shaft section 121 at a proximal end of screw 131 so as to be rotationally driven by a driving force of motor 112, and disposed so as to be coaxial with the rotating shaft of shaft section 121. Screw 131 rotates about the rotation axis AX. Screw 131 is disposed on a side of one end (i.e., the side of power section 110) of actuator section 130. Screw 131 has a rod shape and includes spiral groove 131B on the circumferential surface of the rod. Spiral groove 131B is male-threaded. Screw 131 transmits the power of motor 112 while guide nut 132 on spiral groove 131B moves forward or backward in the direction of rotation axis AX along with the rotation of screw 131. Screw 131 is provided with roller 131A at a distal end portion of screw 131 to enable smooth relative rotation with respect to guide nut 132. Roller 131A is in contact with guide nut 132 and supports the distal end portion of screw 131.

Guide nut 132 is screwed to spiral groove 131B of screw 131. Guide nut 132 includes spiral groove 132A to be screwed to spiral groove 131B. Spiral groove 132A is female-threaded. Guide nut 132 moves in the direction of rotation axis AX within a range in which spiral groove 131B and spiral groove 132A are screwed together. Guide nut 132 is disposed inside spring 141, which will be described, hereinafter. Guide nut 132 guides the movement of spring 141 in the direction of rotation axis AX.

Inner tube 133 is disposed on an outer periphery of spring 141, i.e., disposed along the outer circumference of spring 141. Guide nut 132, inner tube 133 and spring 141 are disposed coaxially. Inner tube 133 has, for example, a cylindrical shape, and includes guided portion 133A guided by sleeve 135 at a circumferential surface of the cylinder. Guided portion 133A is a member corresponding to a specific example of guided portion 20A of the above embodiment. Guided portion 133A is composed of a protruding portion that protrudes in the diameter direction.

Slide end 134 is disposed at a position where slide end 134 is connected to distal end portions of guide nut 132, inner tube 133 and spring 141 (end portion on side of the support section 137). Slide end 134 is disposed at a distal end portion of openable and closable body-opening and closing apparatus 100. Slide end 134 is provided, for example, to be fixed to guide nut 132 and inner tube 133 such that inner tube 133 and slide end 134 move in the direction of rotation axis AX along with the movement of guide nut 132 in the direction of rotation axis AX.

Sleeve 135 is disposed outside spring 141 and inner tube 133. Sleeve 135 has, for example, a substantially cylindrical shape, and includes guide portion 135A that guides the movement of inner tube 133 in the direction of rotation axis AX at a part of sleeve 135 in the circumferential direction. Guide portion 135A is a member corresponding to a specific example of guide portion 40A of the above embodiment. Guide portion 135A has a shape having a length extending in the direction of rotation axis AX, and is composed of a slit. Guided portion 133A is fitted to guide portion 135A to be capable of sliding in the extending direction. Thus, guided portion 133A is prevented by guide portion 135A from rotating about rotation axis AX. Meanwhile, guided portion 133A can freely move in the direction of rotation axis AX. Therefore, sleeve 135 restricts the rotation of guide nut 132, inner tube 133 and slide end 134 (hereinafter, simply referred to as "guide nut 132 and the like") and guides the movement of guide nut 132 and the like in the direction of rotation axis AX.

Cap 136 includes opening portion 136A through which inner tube 133 can be inserted. Cap 136 is provided with protruding portion 136B at an inner surface of cap 136. Protruding portion 136B is fitted to guide portion 135A. Therefore, protruding portion 136B is fitted to guide portion 135A and thereby blocks the rotation of sleeve 135. That is, the rotation of sleeve 135 is restricted by coil base 142 (first rotation restriction section), which will be described hereinafter, and is also restricted by protruding portion 136B; more specifically, the rotation of sleeve 135, itself, is blocked by protruding portion 136B. Cap 136 corresponds to the above-described second rotation restriction section, and restricts the rotation of sleeve 135 together with coil base 142 and also restricts the movement in the direction of rotation axis AX in such a way that sleeve 135 can guide guided portion 133A. Thus, when forward movement of guide nut 21 (driving-force transmission member), which guides biasing member 30, for the distal end side causes a space where guide nut 21 does not exist to be formed inside biasing member 30, cap 136 is interposed between outer tube 111 that guides this portion, and biasing member 30, and can suppress an impact from biasing member 30 to outer tube 111. Note that, cap 136 may also be used as the first rotation restriction section.

Moreover, an inner surface of cap 136 is female-threaded. The female thread of cap 136 is fitted to a male thread of outer tube 111. Therefore, the female thread of cap 136 is fitted to the male thread of outer tube 111 and thereby blocks the rotation of cap 136. That is, the rotation of cap 136 is restricted by outer tube 111; more specifically, the rotation of cap 136, itself, is blocked by outer tube 111.

Support section 137 is provided at an end portion of actuator section 130. Support section 137 is formed in accordance with the attachment position of the openable and closable body to which openable and closable body-opening and closing apparatus 100 is attached. In addition, support section 137 is configured to rotatably support the openable and closable body and composed of, for example, a ball socket joint.

(Spring Section 140)

Spring section 140 includes spring 141 and coil base 142. Spring 141 is a member corresponding to a specific example of biasing member 30 of the above embodiment. Coil base 142 is a member corresponding to a specific example of first rotation restriction section 50 of the above embodiment.

Spring 141 is disposed on an outer periphery of guide nut 132; more specifically, spring 141 is disposed along the outer circumference of guide nut 132. Spring 141 gives biasing force F to slide end 134 and coil base 142 in the direction of rotation axis AX. Spring 141 always gives biasing force F to slide end 134 and coil base 142 in the direction of rotation axis AX when guide nut 132 moves in the direction of rotation axis AX within a range in which spiral grooves 131B and 132A are screwed together. One end of spring 141 is in contact with slide end 134 and the other end of spring 141 is in contact with coil base 142. Spring 141 expands and contracts within a range of expandable and contractible region 30A (see FIG. 1) along with the movement of guide nut 132. The length of expandable and contractible region 30A is set equal to the length of movable region 20B (see FIG. 1). Furthermore, the expandable and contractible amount of spring 141 is always equal to the amount of displacement of guide nut 132. That is, displacement of spring 141 is synchronized with displacement of guide nut 132.

Coil base 142 is composed of a component in which protruding portion 142B extending in the in the direction of rotation axis AX is provided to annular pedestal portion 142A. That is, coil base 142 is provided as a member separate from the non-movable section in openable and closable body-opening and closing apparatus 100. Pedestal portion 142A is a member corresponding to a specific example of pedestal portion 50A of the above embodiment. Protruding portion 142B is a member corresponding to a specific example of protruding portion 50B of the above embodiment. Pedestal portion 142A has a structure (e.g., recessed portion) that holds the end portion of spring 141. Pedestal portion 142A is biased by biasing force F of spring 141 and thereby fixed to the non-movable section in openable and closable body-opening and closing apparatus 100. Protruding portion 142B is fixed to the non-movable section in openable and closable body-opening and closing apparatus 100 via pedestal portion 142A. Protruding portion 142B is fitted to guide portion 135A of sleeve 135. Therefore, protruding portion 142B is fitted to guide portion 135A while being biased by biasing force F of spring 141 and thereby blocks the rotation of sleeve 135.

Cap 136 may be in contact with sleeve 135 or may be disposed apart from sleeve 135 with a predetermined interval interposed therebetween in the direction of rotation axis AX. Coil base 142 may be in contact with sleeve 135 or may be disposed opposite to and apart from cap 136 with a predetermined interval interposed therebetween in the direction of rotation axis AX. Cap 136 and coil base 142 restrict the movement of sleeve 135 in the direction of rotation axis AX in such a way that sleeve 135 can guide guided portion 133A.

[Operation and Effects]

Operation and effects of openable and closable body-opening and closing apparatus 100 are similar to those of openable and closable body-opening and closing apparatus 1 described above.

The present invention has been described using the embodiment and the example (hereinafter simply referred to as "embodiment and the like"), but the present invention is not limited to the embodiment and the like, and various modifications are possible.

REFERENCE SIGNS LIST

1 Openable and closable body-opening and closing apparatus
10 Rotary drive member
20 Driving-force transmission member
20A Guided portion
20B Movable region
21 Guide nut
22 Inner tube
23 Slide end
30 Biasing member
30A Expandable and contractible region
40 Guide member
40A Guide portion
50 First rotation restriction section
50A Pedestal portion
50B Protruding portion
60 Second rotation restriction section
60A Opening portion
60B Protruding portion
100 Openable and closable body-opening and closing apparatus
110 Power section
111 Outer tube
112 Motor
113 Support section
120 Bearing section
121 Shaft section
122 Bearing
130 Actuator section
131 Screw
131A Roller
131B Spiral groove
132 Guide nut
132A Spiral groove
133 Inner tube
133A Guided portion
134 Slide end
135 Sleeve
135A Guide portion
136 Cap
136A Opening portion
136B Protruding portion
137 Support section
140 Spring section
141 Spring
142 Coil base
AX Rotation axis
F Biasing force

The invention claimed is:

1. An openable and closable body-opening and closing apparatus comprising:
a rotary drive member configured to be rotationally driven by a driving force of a drive section;
a driving-force transmission member configured to be driven by the rotary drive member and thereby move in a rotation axis direction of the rotary drive member;
a biasing member disposed on an outer periphery of the driving-force transmission member and configured to give a biasing force to the driving-force transmission member in the rotation axis direction;
a guide member disposed on an outer periphery of the biasing member and configured to guide the driving-force transmission member; and
a first rotation restriction section configured to restrict rotation of the guide member, wherein:
the driving-force transmission member has an inner tube disposed on an outer periphery of the biasing member and on an inner periphery of the guide member,
the guide member includes a slit serving as a guide portion configured to guide the driving-force transmission member in the rotation axis direction while restricting rotation of the driving-force transmission member by restricting rotation of the inner tube,
the inner tube includes a guided portion configured to be guided by the guide portion,
the first rotation restriction section includes a protruding portion extending in the rotation axis direction, and
the protruding portion is fitted to the guide portion to restrict the rotation of the guide member.

2. The openable and closable body-opening and closing apparatus according to claim 1, wherein the first rotation restriction section restricts the rotation of the guide member by being biased by the biasing force of the biasing member.

3. The openable and closable body-opening and closing apparatus according to claim 2, wherein
the first rotation restriction section is rotationally restricted by being biased by the biasing force of the biasing member.

4. The openable and closable body-opening and closing apparatus according to claim 2, further comprising
a second rotation restriction section configured to restrict movement of the guide member in the rotation axis direction and to restrict the rotation of the guide member.

5. The openable and closable body-opening and closing apparatus according to claim 1, wherein
the inner tube covers an outer circumference of the biasing member.

6. The openable and closable body-opening and closing apparatus according to claim 1, further comprising
a slide end that connects a distal end of the driving-force transmission member and a distal end of the inner tube, wherein
as the driving-force transmission member moves in the direction of rotational axis, the inner tube and the slide end also move in the direction of rotational axis.

* * * * *